United States Patent Office 3,217,057
Patented Nov. 9, 1965

3,217,057
PROCESS OF OLEFIN ISOMERIZATION USING AN ALUMINUM FLUORIDE CATALYST
Leslie David Moore and Raymond C. Odioso, Glenshaw, Pa., assignors to Gulf Research & Development Company, Pittsburgh, Pa., a corporation of Delaware
No Drawing. Filed May 23, 1961, Ser. No. 111,933
16 Claims. (Cl. 260—683.2)

This invention relates to a process for the catalytic isomerization of olefins.

There are two types of olefin isomerization, the so-called double bond isomerization which occurs when there is a shift of a hydrogen atom and skeletal isomerization which occurs when the carbon structure of the olefin is rearranged.

In accordance with the invention we have discovered that olefins having from 4 to 20 carbon atoms per molecule can be isomerized in good yields and with good efficiency by contacting under isomerization conditions one or more of such olefins with a catalyst comprising an active anhydrous aluminum fluoride. In one preferred embodiment of this invention we have found that olefins having from 4 to 20 carbon atoms per molecule can be isomerized with excellent efficiency by contacting under isomerization conditions one or more of said olefins with a catalyst comprising an active anhydrous aluminum fluoride combined with, and promoted by, at least one member selected from the group consisting of the metals from Group VIII and the lefthand column of Group IV and VI of the Periodic Table, their oxides and sulfides. In still another preferred embodiment of this invention we have found that olefins having from 5 to 20 carbon atoms per molecule can be skeletally isomerized in high yields and with excellent efficiency by contacting under skeletal isomerization conditions one or more of such olefins with a catalyst comprising an active anhydrous aluminum fluoride combined with, and promoted by, at least one member selected from the group consisting of titanium, chromium and platinum, their oxides and sulfides.

The feed stocks which are suitable for the isomerization process of this invention comprise monoolefins having from 4 to 20 carbon atoms per molecule. In one embodiment of this invention where skeletal isomerization is the desired reaction, the preferred feed stock comprises monoolefins having from 5 to 20 carbon atoms per molecule. Thus, we have found that monoolefins having four carbon atoms per molecule are suitable for double bond isomerization, but are relatively resistant to skeletal rearrangement and consequently are eliminated in the preferred charge stocks for the skeletal isomerization reaction. The term "olefin" is used hereinafter in this application in its usual sense, i.e., to mean monoolefin. The olefins in the feed stock can, of course, be straight chain or branched olefins. We can achieve skeletal isomerization by our process of the straight chain olefins to one or more branched chain isomers while the slightly branched olefins are isomerized to more highly branched forms. Isomerization of the highly branched olefins to the less highly branched olefins will occur when the concentration of highly branched olefins in the feed stock is sufficiently high. Preferred feed stocks for many petroleum or petrochemical purposes are those consisting esentially of pure straight chain olefins or mixtures of straight chain olefins, from which the more highly branched products can be prepared. However, for some petrochemical purposes, such as detergent manufacture, straight chain olefin products are preferred. For this purpose we prefer to charge highly branched olefins, such as propylene tetramer or pentamer and back-isomerize these to the straight chain $C_{12}$ or $C_{15}$ olefins.

Diluent materials, such as paraffins, naphthenes or aromatics, may also be present in the feed stock. Diolefinic and acetylenic diluents should be avoided since they tend to polymerize under the condition of this reaction. Water may also be used as a diluent, but it tends to react with the catalyst and release corrosive hydrogen fluoride at the high reaction temperatures necessary for skeletal isomerization. However, at lower double bond isomerization temperatures a water diluent may be present without adverse effect.

As indicated, the process of this invention is characterized by the use of a particular catalyst comprising an active anhydrous aluminum fluoride. An active anhydrous aluminum fluoride is an anhydrous aluminum fluoride which has an acidity level which is equivalent to the chemical absorpition of between 0.02 to 0.30 milliequivalents of ammonia per gram at 175° C. with retention of between 0.01 to 0.20 milliequivalents of ammonia per gram at 400° C. Preferred active aluminum fluorides have an acidity level equivalent to the chemical adsorption of between 0.02 and 0.20 milliequivalents of ammonia per gram at 175° C. with a retention of between 0.01 and 0.10 milliequivalents of ammonia per gram at 400° C. We have found that anhydrous aluminum fluorides possessing these acidity characteristics are active for the isomerization of olefins and result in good conversions with good efficiencies.

This acidity level can be measured by an ammonia absorption procedure described by A. N. Webb in an article entitled "Hydrofluoric Acid and Acidity of Alumina" in Volume 49, pages 261 to 263 of "Industrial & Engineering Chemistry", 1957.

As indicated, in one preferred embodiment of this invention we have found that olefins having from 5 to 20 carbon atoms per molecule can be isomerized with excellent efficiency by contacting under isomerization conditions one or more of said olefins with a catalyst comprising an active anhydrous aluminum fluoride combined with and promoted by at least one member selected from the group consisting of the metals from Group VIII and the lefthand column of Groups IV and VI of the Periodic Table, their oxides and sulfides. These metals, metal oxides and metal sulfides promote the double bond and skeletal isomerization selectivity of the active aluminum fluoride catalyst when combined therewith. These metals include: titanium, zirconium, hafnium, chromium, molybdenum, tungsten, iron, nickel, cobalt, ruthenium, rhodium, palladium, osmium, iridium and platinum. It has also been found that, in addition to an increase in selectivity, the skeletal isomerization activity of the aluminum fluoride catalyst is promoted by combining with the aluminum fluoride at least one member selected from the group consisting of titanium, chromium and platinum, their oxides and sulfides.

The active anhydrous aluminum fluoride catalyst can be prepared by any suitable method. For example, one method we employed comprises dissolving alumina in at least a stoichiometric amount, and preferably an excess of at least 10 percent over the stoichiometric amount, of aqueous hydrogen fluoride necessary to convert the alumina to aluminum fluoride, followed by precipitation of the aluminum fluoride, separation, drying and calcining at 1000° F. The concentration of the aqueous hydrogen fluoride can vary between 10 to 70 percent. The preferred concentration range is 40 to 60 percent hydrogen fluoride since commercially available aqueous hydrogen fluoride is within this concentration range.

A SPECIFIC METHOD USED TO PREPARE AN ACTIVE ALUMINUM FLUORIDE 2,851 grams of alumina containing 70.9 percent solids (at 1000° F.) were added to 6,980 grams of an aqueous 48 percent hydrogen fluoride solution. This was equivalent to a 41 percent excess of the stoichiometric amount of hydrogen fluoride necessary to convert the alumina to aluminum fluoride. The alumina was added to the aqueous hydrogen fluoride gradually over a period of four and one-half hours in order to control the reaction temperature between 25° to 60° C. The reaction mixture was allowed to stand for 48 hours after which it was filtered. The filtered cake was dried at 250° F. for 24 hours in an aluminum tray. The dried filter cake was then calcined at 400° F. for 13.4 hours after a heatup period of 2.2 hours from room temperature. The 400° F. calcined cake (analysis: 63.75 percent fluorine, 29.96 percent aluminum and 6.29 percent water) was ground to pass a 30 mesh sieve, mixed with two percent of a conventional catalyst lubricant and five percent of a conventional catalyst binder and tableted in 3/16 inch size. The tablets were broken to 10–20 mesh and calcined at 1000° F. for ten hours after a six hour heat-up from room temperature. The analysis of the 1000° F. calcined aluminum fluoride was 67.8 percent fluorine and 32.2 percent aluminum. The aluminum fluoride was found to have an acidity level of 0.08 milliequivalents of ammonia per gram at 175° C. with a retention of 0.04 milliequivalents of ammonia per gram at 400° C.

The preferred catalysts of this invention are prepared by combining the active aluminum fluoride with one or more of the desired metals, metal oxides or metal sulfides defined above by any physical or chemical means well known in the art to form a single composite catalyst. For example, the desired metal or metals can be deposited on the active aluminum fluoride catalyst by any suitable means, such as, by vacuum or atmospheric impregnation from aqueous or non-aqueous solutions of the metal salts. For example, chromium may be deposited from an aqueous solution of chromium nitrate while tungsten and platinum may be deposited from aqueous solutions of ammonium meta-tungstate or chloroplatinic acid, respectively. Titanium may be deposited from a benzene solution of titanium isopropanate. We have deposited the desired metals on the active anhydrous aluminum fluoride from metal salt solutions by atmospheric impregnation using the incipient wetness technique followed by drying and calcining of the resultant catalyst at 1,000° F. The incipient wetness impregnation technique involves adding just sufficient impregnating liquid to saturate the catalyst base. The amount of impregnating liquid to employ is determined from a knowledge of the quantity of catalyst base to be impregnated and the adsorbtivity of the base. Knowing the quantity of the impregnating liquid to employ, the required concentration of metal salt in the impregnating liquid can be calculated so that the desired amount of the metal is deposited.

For example, a 555 gram batch of 10–20 mesh active aluminum fluoride prepared as described in detail above under the heading "A Specific Method Used to Prepare an Active Aluminum Fluoride," was impregnated to the point of incipient wetness with 554 grams of a 50 percent aqueous solution of ammonium metatungstate at atmospheric pressure and room temperature. The impregnated aluminum fluoride was dried at 250° F. for 24 hours and then calcined at 1000° F. for ten hours. The final catalyst contained 25 weight percent tungsten calculated as the oxide.

The amount of metal to be deposited on the active aluminum fluoride can vary between 0.1 to 35 weight percent. Amounts as small as 0.5 weight percent platinum or 1.5 weight percent titanium as titanium oxide or as great as 25 weight percent tungsten as tungsten oxide have been used successfully to promote the active aluminum fluoride for the olefin isomerization reaction. The sulfided forms of the metal catalysts can be prepared by any known procedure, such as, for example, by the direct precipitation of the metal sulfides by known methods onto the aluminum fluoride, or by treating the metal oxides with hydrogen sulfide in the usual manner.

The activity of a catalyst can also be measured by the conversion of the charge olefin to all products including double bond isomers, skeletal isomers, coke, etc. Catalyst selectivity on the other hand is a measure of the catalyst's ability to promote conversion of the charge olefin to a particular desired product. In this case, two primary products are desired, i.e., double bond isomers and skeletal isomers of the charge olefin. The selectivity of the catalyst for double bond isomerization is defined in this application as the weight percent of charge olefin converted to the desired double bond isomers having the same carbon number as the charge olefin divided by the total weight percent conversion of the charge olefin to all products.

The selectivity of the catalyst for skeletal isomerization is defined in a different manner herein, that is, skeletal isomerization selectivity is defined as the weight percent of the charge olefin converted to the desired skeletal isomers having the same carbon number as the charge olefin divided by the total weight percent conversion of the charge olefin to all products other than double bond isomers. The conversion of the charge olefin to double bond isomers is excluded in determining the selectivity of the catalyst for skeletal isomerization since under the more severe reaction conditions required to promote skeletal isomerization the position of the double bond is not critical so far as determining the reactability of the olefin molecule for skeletal isomerization. Thus, it has been found that pentene-1 and pentene-2 are equivalent charge stocks for skeletal isomerization. That is, both pentene-1 and pentene-2 under essentially the same reaction conditions and using essentially the same catalyst were found to produce equal amounts of skeletal isomers in the product. However, the total conversion of pentene-1 was much greater due solely to double bond isomerization to pentene-2 since pentene-2 is the thermodynamically favored form. Pentene-2 was used in most of the experiments to study skeletal isomerization since pentene-2 is more readily available and is less expensive than pentene-1. By using the definition of skeletal isomerization selectivity defined above, the skeletal isomerization selectivities of various catalysts can be compared even though different charge olefins, i.e., pentene-1 and pentene-2, were employed.

The reaction conditions which promote the isomerization reactions of this invention can vary within wide limits. As indicated above, the so-called double bond isomerization occurs much more readily than the skeletal isomerization of the olefins. This is shown by the fact that much less severe reaction conditions are required to facilitate double bond isomerization. As the reaction conditions become more severe, the weight percent conversion of the charge olefin to skeletal isomers increases. Double bond isomerization continues to occur at the more severe reaction conditions as dictated by equilibrium considerations for the olefin charge stock involved, but the double bond isomerization is accompanied by skeletal isomerization. Thus, reaction temperatures between 200° F. to 1,200° F. can be employed with temperatures between 200° F. to 600° F. usually being employed to promote primarily double bond isomerization and temperatures between 600° F. to 1,200° F. usually being employed to promote primarily skeletal isomerization.

The reaction severity is determined not only by temperature, however, but also by the liquid-hourly space velocity or contact time of the reaction. Space velocities between about 0.5 to 40 vol./vol./hr. or above can be used. Space velocities below about 0.5 vol./vol./hr. become uninteresting from a commercial viewpoint due to low throughputs and space velocities above about 40 become uninteresting due to reduced conversions. The preferred range of space velocities for double bond isomerization is between 0.5 to 30 vol./vol./hr. while the preferred range of space velocities for promoting the skeletal isomerization reaction is between 0.5 to 10 vol./vol./hr. The temperatures are adjusted within this range of space velocities to obtain the desired isomer product.

Pressure can vary from atmospheric or below to 100 p.s.i.g. or more. Increase in pressure, however, tends to promote the undesirable polymerization and coking reactions.

The process of this invention will be further described with reference to the following specific examples. The reaction pressure in all examples was atmospheric.

The active aluminum fluoride used in the following examples either alone or with metals or metal oxides deposited thereon was prepared as described in detail above under the heading "A Specific Method Used to Prepare an Active Aluminum Fluoride."

*Example 1*

Butene-1 was charged downflow through a bed of 10–20 mesh active aluminum fluoride granules at a liquid-hourly space velocity of 3.2 vol./vol./hr. and a reaction temperature of 550° F. The products were collected and analyzed after a one hour run. The product analyses are shown on Table I.

*Example 2*

Example 1 was repeated except the reaction temperature was increased to 750° F. Product analyses for this run are also shown on Table I.

*Example 3*

Example 1 was repeated except the reaction temperature was increased to 950° F. The product analyses for this run are also shown on Table I. The higher temperature runs were made in the expectation of significantly increasing the skeletal isomerization of the butene-1.

*Example 4*

Example 3 was repeated except the catalyst was an .11 percent chromium as chromium oxide on active aluminum fluoride and the liquid-hourly space velocity was slightly greater at 3.6 vol./vol./hr. The product distribution for this run is also included on Table I. The selectivity of conversion of butene-1 to the double bond isomer butene-2 was 95.6 percent even at the elevated temperature of 950° F. In addition, the percent selectivity to total $C_4$'s was improved. It should also be noted that in no run was there any appreciable skeletal isomerization.

TABLE I

| Example Number | 1 | 2 | 3 | 4 |
|---|---|---|---|---|
| Catalyst | (1) | (1) | (1) | (2) |
| Charge Stock | (3) | (3) | (3) | (3) |
| Reaction Conditions: | | | | |
| Temperature, ° F | 550 | 750 | 950 | 950 |
| Space Velocity, Vol./Vol./Hr | 3.2 | 3.2 | 3.2 | 3.6 |
| Product Distribution (Weight Percent Based on Charge): | | | | |
| n-Butene-1 | 19.4 | 20.2 | 24.9 | 30 |
| n-Butene-2 | 69.8 | 58.8 | 55.2 | 67 |
| Isobutylene | 3.3 | 5.4 | 7.2 | 2 |
| Other $C_4$ | | 0.3 | 0.8 | |
| Lighter than $C_4$ | 2.1 | 4.2 | 6.2 | |
| Heavier than $C_4$ | 5.4 | 11.1 | 5.6 | 1 |
| Coke | | | | |
| Total Weight Percent Conversion | 80.6 | 79.8 | 75.1 | 70 |
| Total Weight Percent Conversion to Products Other than Double Bond Isomers | 10.8 | 21.0 | 19.8 | 3 |
| Percent Selectivity for Double Bond Isomerization to n-Butene-2 | 86.5 | 73.6 | 73.4 | 95.6 |
| Percent Selectivity for Skeletal Isomerization to Isobutylene | 30.6 | 25.7 | 39.5 | 66.6 |
| Percent Selectivity to Total $C_4$'s | 92.5 | 84.7 | 88.2 | 99 |

[1] Active $AlF_3$.
[2] 11% Cr as $Cr_2O_3$ on Active $AlF_3$.
[3] Butene-1.

*Example 5*

Pentene-1 was charged downflow through a bed of 10–20 mesh catalyst consisting of 25 percent tungsten as tungsten oxide on active aluminum fluoride, prepared as described in detail above, at a liquid-hourly space velocity of 3.2 and a reaction temperature of 550° F. The products were collected and analyzed after a one hour run. The product analyses are shown on Table II.

*Example 6*

Example 5 was repeated except the reaction temperature was increased to 750° F. The product analyses for this run are also shown on Table II.

*Example 7*

Example 5 was repeated except the reaction temperature was increased to 950° F. The product analyses for this run also shown on Table II.

A comparison of the product analyses of the runs for Examples 5 through 7 shows that a temperature of 550° F. the isomerization reaction is almost exclusively double bond isomerization with very little, i.e., only 1.6 percent, skeletal isomerization occurring. As the reaction temperature increases the amount of skeletal isomerization also increases. In all cases the selectivity to products having 5 carbon atoms per molecule was almost 100 percent.

TABLE II

| Example Number | 5 | 6 | 7 |
|---|---|---|---|
| Catalyst | 25% Tungsten Oxide on Active $AlF_3$ | | |
| Charge Stock | Pentene-1 | Pentene-1 | Pentene-1 |
| Reaction Conditions: | | | |
| Temperature, ° F | 550 | 750 | 950 |
| Space Velocity (Vol./Vol./Hr.) | 3.2 | 3.2 | 3.2 |
| Product Distribution (Weight Percent Based on Charge): | | | |
| n-Pentene-1 | 33 | 14 | 16 |
| n-Pentene-2 | 65 | 72.6 | 55.8 |
| Isopentenes | 1.6 | 12.9 | 26.9 |
| Other $C_5$'s | | | 0.2 |
| Lighter than $C_5$ | 0.3 | 0.2 | 0.6 |
| Coke and Polymer | 0.1 | 0.3 | 0.5 |
| Total Weight Percent Conversion | 67 | 86 | 84 |
| Total Weight Percent Conversion to Products Other than Double Bond Isomers | 2 | 13.4 | 28.2 |
| Percent Selectivity for Double Bond Isomerization to n-Pentene-2 | 97 | 84.5 | 66.5 |
| Percent Selectivity for Skeletal Isomerization to Isopentenes | 80 | 96 | 95.5 |
| Percent Selectivity to Total $C_5$'s | 99.6 | 99.5 | 98.9 |

*Example 8*

Pentene-1 was charged downflow through a bed of 10–20 mesh active aluminum fluoride granules at a liquid-hourly space velocity of 1.0 vol./vol./hr. and a reaction temperature of 950° F. The products were collected and analyzed after a one hour run. The product analyses are shown on Table III.

*Example 9*

Example 8 was repeated except the catalyst was an 11 percent chromium as chromium oxide on active aluminum fluoride. The product analyses for this run are also shown on Table III.

*Example 10*

Example 9 was repeated except the charge stock was pentene-2. The product analyses for this run are also shown on Table III.

A comparison of Examples 9 and 10 shows that pentene-1 and pentene-2 are equivalent charge stocks so far as skeletal isomerization is concerned and at the reaction conditions employed skeletal isomerization was the primary reaction being investigated.

Since pentene-2 is a more readily available charge material, it was employed in succeeding examples to study the promotional effect of other metals on the active aluminum fluoride catalyst primarily for the skeletal isomerization reaction.

EXAMPLE 11

Example 10 was repeated except the catalyst was 1.5 percent titanium as titanium oxide on active aluminum fluoride. The product distribution for this run is also included on Table III.

EXAMPLE 12

Example 10 was repeated except the catalyst was 0.5 percent molybdenum as molybdenum oxide on active The product distribution for this run is also included on Table III.

A comparison of Examples 9 through 12 with Example 8 shows that both the activity and the selectivity of the active aluminum fluoride for skeletal isomerization was promoted by the addition of chromium, titanium or platinum.

EXAMPLE 13

Example 10 was repeated except the catalyst was 10 percent molybdenum as molybedenum oxide on active aluminum fluoride. The product distribution for this run is also included on Table III.

A comparison of Example 13 with Example 8 shows that the selectivity of the active aluminum fluoride for skeletal isomerization has been promoted by the addition of molybdenum.

EXAMPLE 14

Example 10 was repeated except the catalyst was a commercially available anhydrous aluminum fluoride having an acidity level of 0.009 milliequivalents of ammonia per gram at 175° C. with no retention of ammonia at 400° C. The product distribution for this run is also included on Table III.

A comparison of Examples 14 and 8 shows the advantage in activity and skeletal isomerization selectivity for an aluminum fluoride which possesses an acidity level as defined in this application.

EXAMPLE 15

Example 10 was repeated except the catalyst was a 6 percent chromium as chromium oxide on the same commercially available aluminum fluoride as used in Example 14 above. The product distribution is also shown on Table III.

A comparison of Example 15 with Example 14 shows the deposition of chromium as chromium oxide has no beneficial effect on the commercial aluminum fluoride, whereas comparing Example 10 with Example 8, the deposition of chromium as chromium oxide did have a beneficial effect on the aluminum fluoride possessing an acidity level as defined in this application.

TABLE III

| Example Number | 8 | 9 | 10 | 11 | 12 | 13 | 14 | 15 |
|---|---|---|---|---|---|---|---|---|
| Catalyst | Active AlF$_3$ | 11% Cr as Cr$_2$O$_3$ on Active AlF$_3$ | 1.5% Ti as TiO$_2$ on Active AlF$_3$ | 0.5% Pt on Active AlF$_3$ | 10% Mo as MoO$_2$ on Active AlF$_3$ | Commercial AlF$_3$ | 6% Cr as Cr$_2$O$_3$ on commercial AlF$_3$ |
| Charge Stock | Pentene 1 | Pentene =1 | Pentene =2 | Pentene =2 | Pentene =2 | Pentene =2 | Pentene =2 | Pentene =2 |
| Reaction Conditions: | | | | | | | | |
| Temperature, ° F | 950 | 950 | 950 | 950 | 950 | 950 | 950 | 950 |
| Space Velocity, Vol./Vol./Hr. | 1.0 | 1.0 | 1.0 | 1.0 | 1.0 | 1.0 | 1.0 | 1.0 |
| Product Distribution (Wt. percent Based on Chge.). | | | | | | | | |
| n-Pentene-1 | 6 | 8 | 8 | 5 | 6 | 16 | 3 | 3 |
| n-Pentene-2 | 37 | 33 | 34 | 26 | 32 | 70 | 93 | 92 |
| Isopentenes | 44 | 56 | 55 | 62 | 59 | 12 | 3 | 2 |
| Other C$_5$'s | | 1 | 2 | | | | | |
| Lighter than C$_5$ Coke and Polymer | 13 | 2 | 1 | 6 | 3 | 2 | 1 | 3 |
| Total Weight Percent Conversion | 94 | 92 | 66 | 74 | 68 | 30 | 7 | 8 |
| Total Weight Percent Conversion to Products Other than Double Bond Isomers | 57 | 59 | 58 | 69 | 62 | 14 | 4 | 5 |
| Total Weight Percent Conversion to Skeletal Isomers | 44 | 56 | 55 | 62 | 59 | 12 | 3 | 2 |
| Percent Selectivity for Double Bond Isomerization. | | | | | | | | |
| To n-Pentene-2 | 39.4 | 35.8 | | | | | | |
| To n-Pentene-1 | | | 12.1 | 6.8 | 8.8 | 53.4 | 42.8 | 37.5 |
| Percent Selectivity for Skeletal Isomerization to Isopentenes | 77.2 | 94.9 | 94.9 | 89.9 | 95.2 | 85.7 | 75 | 62.5 |
| Percent Selectivity to Total C$_5$'s | 87 | 98 | 99 | 94 | 97 | 98 | 99 | 97 |

EXAMPLE 16

A mixture of olefins and paraffins having 5 carbon atoms per molecule was passed downflow through a 10–20 mesh bed of 11 percent chromium as chromium oxide on active aluminum fluoride granules at a liquid-hourly space velocity of 1.0 vol./vol./hr. based on the olefin content of the charge and at a reaction temperature of 950° F. Analysis of the feed stock and products are given in Table IV.

TABLE IV

| | Charge Stock | Product |
|---|---|---|
| n-Pentane | 13.6 | 13.4 |
| Isopentane | 24.3 | 24.7 |
| n-Pentene-1 | 7.6 | 3.3 |
| n-Pentene-2 | 43.4 | 18.2 |
| Isopentenes | 10.5 | 38.4 |
| Other C$_5$'s | 0.6 | 0.4 |
| Coke | | 0.2 |
| Lighter Than C$_5$ | | 1.4 |

The total conversion of olefins was 59.1 percent with 29.5 weight percent conversion to other than double bond isomers. The selectivity for skeletal isomerization was, therefore, 94.6 percent, which is essentially identical with the skeletal isomerization selectivity for this catalyst when in Examples 9 and 10 above. The paraffinic diluents were, therefore, essentially inert in this reaction.

*Example 17*

Example 16 was repeated except the charge stock was hexene-1. Product distribution is shown in Table V below.

TABLE V

| Hydrocarbon: | Weight, percent in product |
|---|---|
| n-Hexenes | 24.7 |
| Methylpentenes | 58.0 |
| Dimethylbutenes | 8.1 |
| Lighter than C$_6$ | 7.8 |
| Heavier than C$_6$ | 1.1 |
| Methylcyclopentenes | 0.3 |

The selectivity for skeletal isomerization was 88 percent.

Resort may be had to such variations and modifications as fall within the spirit of the invention and the scope of the appended claims.

We claim:

1. A process for the skeletal isomerization of an olefin having from 5 to 20 carbon atoms per molecule which comprises contacting at least one of said olefins at a temperature between 600° to 1200° F. and a space velocity betwen 0.5 to 10 volumes of olefin per volume of catalyst per hour with a catalyst consisting essentially of active anhydrous aluminum fluoride combined with between 0.1 and 35 weight percent of at least one member selected from the group consisting of the metals of Group VIII and the lefthand column of Groups IV and VI of the Periodic Table, their oxides and sulfides, said aluminum fluoride having an acidity level which is equivalent to the chemical absorption of between 0.02 and 0.30 milliequivalents of ammonia per gram at 175° C. with retention of between 0.01 to 0.20 milliequivalents of ammonia per gram at 400° C.

2. The process according to claim 1 wherein the catalyst consists essentially of active anhydrous aluminum fluoride and between 0.1 and 35 weight percent of platinum, said aluminum fluoride having an acidity level which is equivalent to the chemical absorption of between 0.02 to 0.30 milliequivalents of ammonia per gram at 175° C. with retention of between 0.01 to 0.20 milliequivalents af ammonia per gram at 400° C.

3. A process for the skeletal isomerization of an olefin having five carbon atoms per molecule which comprises contacting said olefin at a temperature between 600° to 1200° F., a space velocity between 0.5 to 10 volumes of olefin per volume of catalyst per hour and atmospheric pressure with a catalyst consisting essentially of active anhydrous aluminum fluoride combined with between 0.1 and 35 weight percent of at least one member selected from the group consisting of metals of Group VIII and the lefthand column of Groups IV and VI of the Periodic Table, their oxides and sulfides, said aluminum fluoride having an acidity level which is equivalent to the chemical absorption of between 0.02 to 0.30 milliequivalents of ammonia per gram at 175° C. with retention of between 0.01 to 0.20 milliequivalents of ammonia per gram at 400° C.

4. A process according to claim 3 wherein the catalyst consists essentially of active anhydrous aluminum fluoride and tungsten oxide.

5. The process according to claim 3 wherein the catalyst consists essentially of active anhydrous aluminum fluoride and between 0.1 and 35 weight percent of platinum, said aluminum fluoride having an acidity level which is equivalent to the chemical absorption of between 0.02 to 0.30 milliequivalents of ammonia per gram at 175° C. with retention of between 0.01 to 0.20 milliequivalents of ammonia per gram at 400° C.

6. The process according to claim 5 wherein the olefin is pentene-2.

7. A process for the skeletal isomerization of an olefin having from 5 to 20 carbon atoms per molecule which comprises contacting at least one of said olefins at a temperature between 600° and 1200° F. and a space velocity between 0.5 to 10 volumes of olefin per volume of catalyst per hour with a catalyst consisting essentially of active anhydrous aluminum fluoride combined with between 0.1 and 35 weight percent of titanium oxide, said aluminum fluoride having an acidity level which is equivalent to the chemical absorption of between 0.02 to 0.30 milliequivalents af ammonia per gram at 175° C. with retention of between 0.01 to 0.20 milliequivalents of ammonia per gram at 400° C.

8. A process for the skeletal isomerization of an olefin having from 5 to 20 carbon atoms per molecule which comprises contacting at least one of said olefins at a temperature between 600° and 1200° F. and a space velocity between 0.5 to 10 volumes of olefin per volume of catalyst per hour with a catalyst consisting essentially of active anhydrous aluminum fluoride combined with between 0.1 and 35 weight percent of chromium oxide, said aluminum fluoride having an acidity level which is equivalent to the chemical absorption of between 0.02 to 0.30 milliequivalents of ammonia per gram at 175° C. with retention of between 0.01 to 0.20 milliequivalents of ammonia per gram at 400° C.

9. A process for the skeletal isomerization of an olefin having 5 carbon atoms per molecule which comprises contacting said olefin at a temperature between 600° and 1200° F., a space velocity between 0.5 and 10 volumes of olefin per volume of catalyst per hour and atmospheric pressure with a catalyst consisting essentially of active anhydrous aluminum fluoride combined with between 0.1 and 35 weight percent of titanium oxide, said aluminum fluoride having an acidity level which is equivalent to the chemical absorption of between 0.02 to 0.30 milliequivalents af ammonia per gram at 175° C. with retention of between 0.01 to 0.20 milliequivalents of ammonia per gram at 400° C.

10. A process according to claim 9 wherein the olefin is pentene-2.

11. A process for the skeletal isomerization of an olefin having 5 carbon atoms per molecule which comprises contacting said olefin at a temperature between 600° and 1200° F., a space velocity between 0.5 and 10 volumes of olefin per volume of catalyst per hour and atmospheric pressure with a catalyst consisting essentially of active anhydrous aluminum fluoride combined with between 0.1 and 35 weight percent of chromium oxide, said aluminum fluoride having an acidity level which is equivalent to the chemical absorption of between 0.02 to 0.30 milliequivalents of ammonia per gram at 175° C. with retention of between 0.01 to 0.20 milliequivalents of ammonia per gram at 400° C.

12. A process according to claim 11 wherein the olefin is pentene-2.

13. A process for the isomerization of an olefin having from 4 to 20 carbon atoms per molecule which comprises contacting at least one of said olefins under isomerization conditions including a temperature between 200° and 1200° F. with a catalyst consisting essentially of active anhydrous aluminum fluoride combined with between 0.1 and 35 weight percent of titanium oxide, said aluminum fluoride having an acidity level which is equivalent to the chemical absorption of between 0.02 to 0.30 milliequivalents of ammonia per gram at 175° C. with retention of between 0.01 to 0.20 milliequivalents of ammonia per gram at 400° C.

14. The process according to claim 13 wherein the olefin has from four to six carbon atoms per molecule.

15. A process for the isomerization of an olefin having from 4 to 20 carbon atoms per molecule which comprises contacting at least one of said olefins under isomerization conditions including a temperature between 200° and 1200° F. with a catalyst consisting essentially of active anhydrous aluminum fluoride combined with between 0.1 and 35 weight percent of chromium oxide, said aluminum fluoride having an acidity level which is equivalent to the chemical absorption of between 0.02 to 0.30 milliequivalents of ammonia per gram at 175° C. with retention of between 0.01 to 0.20 milliequivalents of ammonia per gram at 400° C.

16. A process for the isomerization of an olefin having from 4 to 6 carbon atoms per molecule which comprises contacting at least one of said olefins under isomerization conditions including a temperature between 200° and 1200° F. with a catalyst consisting essentially of active anhydrous aluminum fluoride with between 0.1 and 35 weight percent of chromium oxide, said aluminum fluoride having an acidity level which is equivalent to the chemical absorption of between 0.02 to 0.30 milliequivalents of ammonia per gram at 175° C. with retention of between 0.01 to 0.20 milliequivalents of ammonia per gram at 400° C.

References Cited by the Examiner

UNITED STATES PATENTS

| | | | |
|---|---|---|---|
| 2,271,043 | 1/42 | VanPeski | 260—683.75 X |
| 2,289,375 | 7/42 | Mattox | 260—683.2 X |
| 2,290,189 | 7/42 | Ipatieff et al. | 260—683.75 |
| 2,322,622 | 6/43 | Fischer et al. | |
| 2,471,647 | 5/49 | Oblad et al. | 260—683.2 |
| 2,568,964 | 9/51 | Montgomery et al. | 260—683.2 |
| 2,579,669 | 12/51 | Hillyer et al. | 260—683.2 |
| 2,733,219 | 1/56 | Bloch | 260—683.75 |
| 2,830,106 | 4/58 | Good et al. | 260—683.15 |
| 2,924,629 | 2/60 | Donaldson | 260—683.2 X |
| 2,980,603 | 4/61 | Fear | 208—143 X |
| 2,985,699 | 5/61 | Schwartz et al. | 260—683.75 |

FOREIGN PATENTS 534,151    2/41    Great Britain.

ALPHONSO D. SULLIVAN, *Primary Examiner.*

MILTON STERMAN, PAUL M. COUGHLAN,
*Examiners.*

UNITED STATES PATENT OFFICE
CERTIFICATE OF CORRECTION

Patent No. 3,217,057                      November 9, 1965

Leslie David Moore et al.

It is hereby certified that error appears in the above numbered patent requiring correction and that the said Letters Patent should read as corrected below.

Column 2, line 4, for "condition" read -- conditions --; column 6, line 18, after "run" insert -- are --; line 20, after "that" insert -- at --; column 7, line 39, strike out "percent molybdenum as molybdenum oxide on active" and insert instead -- percent platinum as the metal on active aluminum fluoride. --; column 8, line 59, after "when" insert -- either pentene-1 or pentene-2 were charged alone as shown --; column 9, lines 30 and 70, for "af", each occurrence, read -- of --.

Signed and sealed this 27th day of September 1966.

(SEAL)
Attest:

ERNEST W. SWIDER                      EDWARD J. BRENNER
Attesting Officer                      Commissioner of Patents